United States Patent
Miyazaki

(10) Patent No.: US 12,049,005 B2
(45) Date of Patent: Jul. 30, 2024

(54) ROBOT DEVICE

(71) Applicant: FANUC CORPORATION, Yamanashi (JP)

(72) Inventor: Genki Miyazaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/002,042

(22) PCT Filed: Jun. 10, 2021

(86) PCT No.: PCT/JP2021/022130
§ 371 (c)(1),
(2) Date: Dec. 15, 2022

(87) PCT Pub. No.: WO2021/256375
PCT Pub. Date: Dec. 23, 2021

(65) Prior Publication Data
US 2023/0226683 A1    Jul. 20, 2023

(30) Foreign Application Priority Data
Jun. 17, 2020  (JP) .................................. 2020-104457

(51) Int. Cl.
*B25J 9/10*     (2006.01)
*B25J 9/06*     (2006.01)

(52) U.S. Cl.
CPC ...... *B25J 9/06* (2013.01); *B25J 9/106* (2013.01)

(58) Field of Classification Search
CPC ..................................... B25J 9/06; B25J 9/106
See application file for complete search history.

(56) References Cited

U.S. PATENT DOCUMENTS 5,265,489 A * 11/1993 Tohnai ................. B25J 9/046
                                                          414/917

FOREIGN PATENT DOCUMENTS

| CN | 201645484 U | 11/2010 |
|---|---|---|
| JP | S57-21297 A | 2/1982 |
| JP | S60-056490 U | 4/1985 |
| JP | H01-310885 A | 12/1989 |

(Continued)

OTHER PUBLICATIONS

Machine translation of KR-20200000252-U (Year: 2020).*
International Search Report issued in PCT/JP2021/022130; mailed Aug. 31, 2021.

*Primary Examiner* — Randell J Krug
(74) *Attorney, Agent, or Firm* — Studebaker & Brackett PC

(57) ABSTRACT

A robot device simplifies processing of flanges integrated with a base part, making it possible to use a small number of adapter components to connect corresponding decelerators to the processed flanges. The base part houses decelerators that drive a first arm and a second arm that have a parallel link. Two first decelerators are arranged on either side of the first arm so as to be parallel and drive the first arm. A second decelerator is arranged parallel to the two first decelerators and drives the second arm. Two first adaptor components are respectively arranged between the base part and the two first decelerators and connect the base part and the first decelerators; and a second adapter component is arranged between the base part and the second decelerator and connects the base part and the second decelerator.

3 Claims, 11 Drawing Sheets

(56) References Cited

FOREIGN PATENT DOCUMENTS

| | | | |
|---|---|---|---|
| JP | H06-071089 U | | 10/1994 |
| JP | H09-150389 A | | 6/1997 |
| JP | 2018-187711 A | | 11/2018 |
| KR | 20200000252 U | * | 1/2020 |

* cited by examiner

ROBOT DEVICE

TECHNICAL FIELD

The present disclosure relates to a robot device.

BACKGROUND ART

Conventionally, a large-sized (large-capacity) speed reducer is commonly employed in a robot device that conveys a large-sized transportable (e.g., 1 ton or more) heavy object because the load applied to the speed reducer of a joint (the base of a first arm (J2 arm)) of the robot increases. Since the large-capacity speed reducer has a large external size, the joint of the robot also becomes large. A robot mechanism including a plurality of arms and speed reducers is disclosed in Patent Document 1 below.

In this type of robot device, as a method of reducing the size of the joint, there has been proposed a structure in which two small-sized (small-capacity) speed reducers are arranged so as to sandwich the first arm from both sides, and each speed reducer is coupled to the base. With such a structure, the joint can be reduced in size without using a large-capacity speed reducer. Further, for example, by using two speed reducers in parallel, the rated capacity is doubled, and it becomes possible to design a robot capable of dealing with a higher load.

Patent Document 1: Japanese Unexamined Patent Application, Publication No. S57-021297

DISCLOSURE OF THE INVENTION

Problems to Be Solved By the Invention

On the other hand, in a robot device provided with a parallel link, the speed reducer (J3 axis) of a second arm driven to rotate by the parallel link is commonly arranged coaxially with the rotation axis (J2 axis) of the first arm. Therefore, even when one speed reducer is provided for each of the J2 axis and the J3 axis, a structure is adopted in which the two speed reducers are coaxially arranged in parallel.

When two speed reducers are arranged on the J2 axis, three speed reducers are arranged coaxially in parallel. In this case, the base part (J2 base) that fixes the speed reducers has three flanges in parallel that are integrally formed on the base part for convenience. In this way, when the number of speed reducers is increased, it is difficult to process the flanges to form interfaces (installation surfaces, bolt holes, etc.) for coupling the speed reducers to the base part due to the structure of the flanges integrally formed on the base part.

Specifically, when, in a robot device in which a plurality of flanges are integrally formed on a base part, for example, three flanges are arranged in parallel, if an outer flange is not hollow, inner flanges cannot be processed with a tool.

Further, even when three hollow flanges are arranged in parallel, if the distance from the outer flange to the innermost flange is long, sufficient processing of the flanges becomes difficult due to restriction of the strength of the tool or the like.

Therefore, in a robot device in which a plurality of flanges are to be integrally formed on a base part, it is desirable to simplify the processing of the flanges for arranging a plurality of speed reducers in parallel, and to couple corresponding speed reducers to the processed flanges with a small number of adapter components.

Means for Solving the Problems

A robot device of the present disclosure provided with a base part that houses speed reducers for driving a first arm and a second arm that have a parallel link, includes two first speed reducers for driving the first arm and arranged in parallel so as to sandwich the first arm, a second speed reducer for driving the second arm and arranged in parallel with the two first speed reducers, two first adapter components respectively arranged between the base part and each of the two first speed reducers and respectively coupling the base part to each of the first speed reducers, and a second adapter component arranged between the base part and the second speed reducer and coupling the base part to the second speed reducer.

Effects of the Invention

According to an aspect of the present disclosure, it is possible to simplify the processing of flanges that are to be integrally formed on a base part of a robot device, and to couple a plurality of corresponding speed reducers to the processed flanges with a small number of adapter components.

PREFERRED MODE FOR CARRYING OUT THE INVENTION

Hereinafter, embodiments of the present invention will be described in detail with reference to the drawings.

First Embodiment

Figure 1:
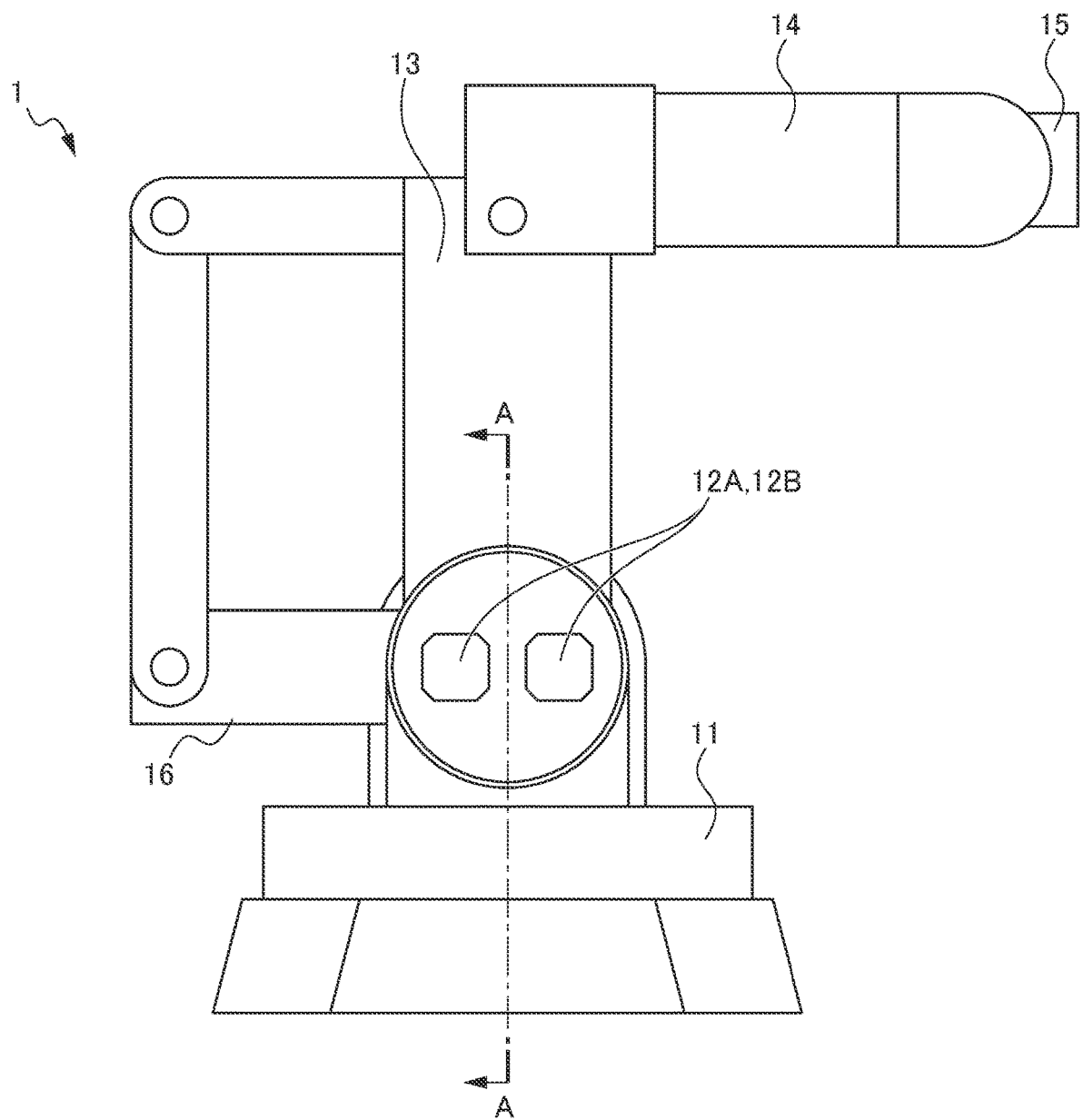
FIG. 1 is a side view showing an example of a robot device with a parallel link.
Figure 2:
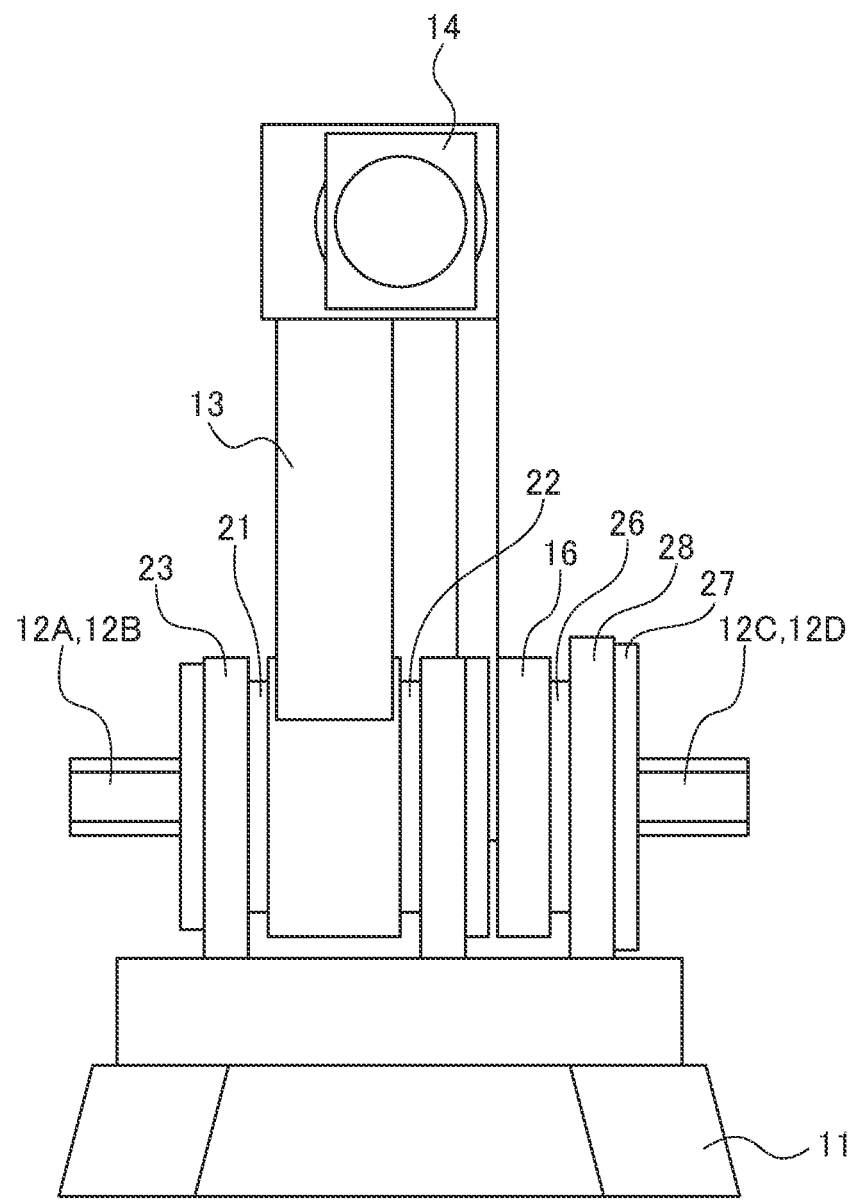
FIG. 2 is an elevation view of the robot device of FIG. 1.

FIG. 1 is a side view illustrating the mechanism of a robot device with a parallel link. FIG. 2 is an elevation view of the robot device shown in FIG. 1.

In FIGS. 1 and 2, in the mechanism of a robot device 1 shown in this example, first arm motors 12A and 12B for moving a first arm 13 are arranged in a base part 11. A parallel link 16 is movable in association with the movement of a second arm 14 via two joints. The second arm 14 is rotatable about a second arm rotation center (J3 axis). A tool or the like is detachably attached to an end effector 15. The speed reducer (J3 axis) of the second arm 14 is arranged coaxially with the rotation axis (J2 axis) of the first arm 13 as described later. In the example of the robot device 1 shown in FIG. 2, the number of motors per axis is two, but the number of motors per axis may be one or three.

Figure 3:
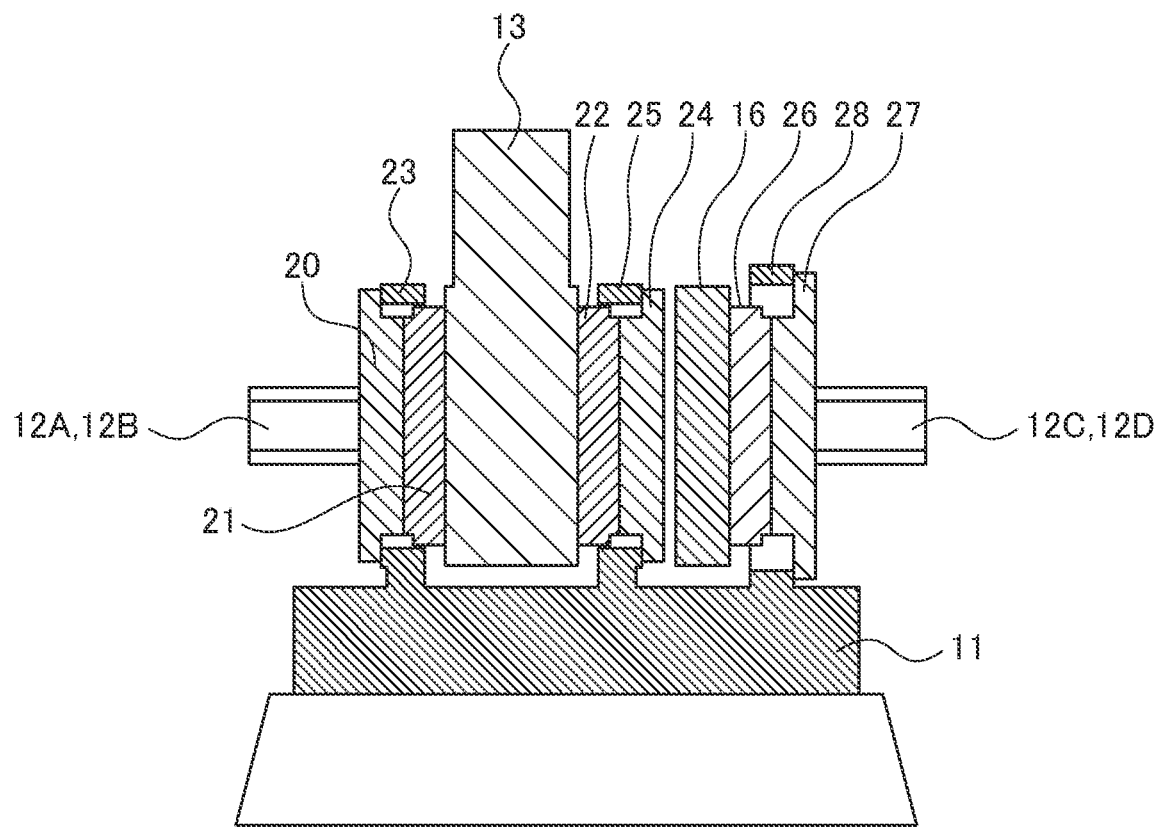
FIG. 3 is a sectional view taken along line A-A of the side view shown in FIG. 1 illustrating the arrangement of the speed reducers of the robot device.
Figure 4:
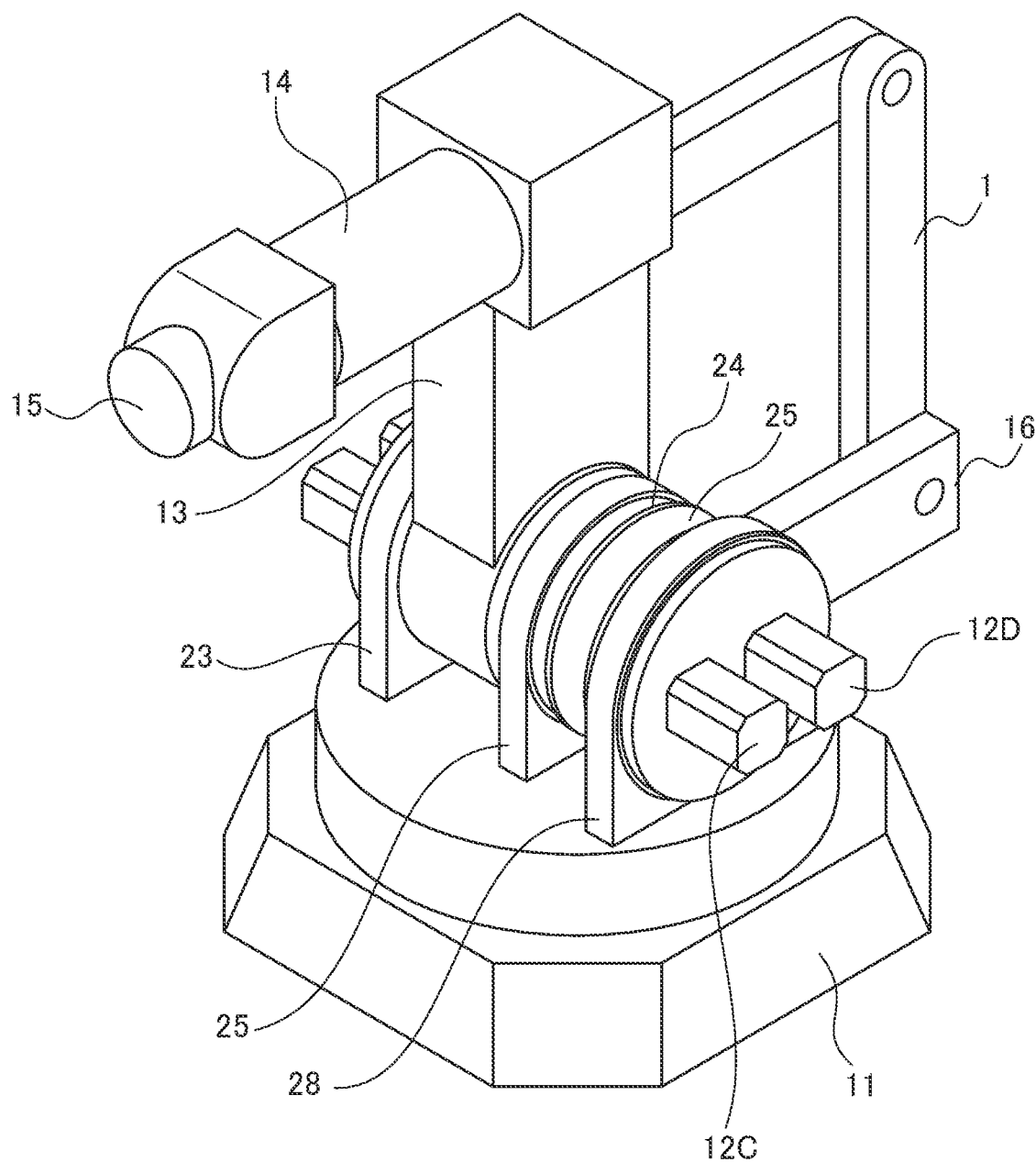
FIG. 4 is a perspective view showing an appearance of the robot device.

FIG. 3 is a sectional view taken along line A-A of the side view shown in FIG. 1 illustrating the arrangement of the speed reducers of the robot device. FIG. 4 is a perspective view showing an appearance of the robot device according to the present embodiment. The same components as those in FIGS. 1 and 2 are denoted by the same reference numerals, and description thereof is omitted.

In FIG. 3, two first speed reducers 21 and 22 are arranged so as to sandwich the first arm 13 from both sides, and the first speed reducer 21 is coupled to a first flange 23 using a first adapter component 20 by tightening bolts (not shown). The other first speed reducer 22 is coupled to a second flange 25 using a first adapter component 24 by tightening bolts (not shown). Here, power is transmitted to the first speed reducer 22 via a drive shaft or the like.

A second speed reducer 26 is arranged between the parallel link 16 and a second adapter component 27, and is coupled to a third flange 28 using the second adapter component 27 by tightening bolts.

Although the present embodiment shows a case in which the adapter component is a single component, a plurality of adapter components may be used to couple a speed reducer to a corresponding flange.

Further, the motor for each speed reducer may be directly coupled to the corresponding adapter, or may be coupled via a separate component. In the application of the present embodiment, the input method and structure of a motor, a gear, and the like are not limited at all.

In the robot device according to the present embodiment, with regard to the position in which the first speed reducers 21 and 22 for driving the first arm 13 and the second arm 14 that have the parallel link 16 are housed, two first speed reducers 21 and 22 are arranged so as to sandwich the first arm 13 of the base part 11 from both sides. Further, by arranging the second speed reducer 26 for driving the second arm in parallel with the first speed reducers 21 and 22, it is possible to arrange a plurality of speed reducers in a low-capacity speed reducer housing space.

Here, the outer diameter of the second adapter component 27 as a component to assemble the second speed reducer 26 is larger than that of the first adapter component 24 to assemble the first speed reducer 22. The outer diameter of the hollow second flange 25 is smaller than that of the third flange 28. Thus, when the second speed reducer 26 for the second arm 14 is coupled to the base part 11, the step of coupling the first speed reducers 21 and 22 for the first arm 13 to the base part 11 and the step of coupling the second speed reducer 26 for the second arm 14 to the base part 11 are performed without issue, whereby the three speed reducers for the first arm 13 and the second arm 14 can be coupled to the base part 11 in parallel.

Figure 5:
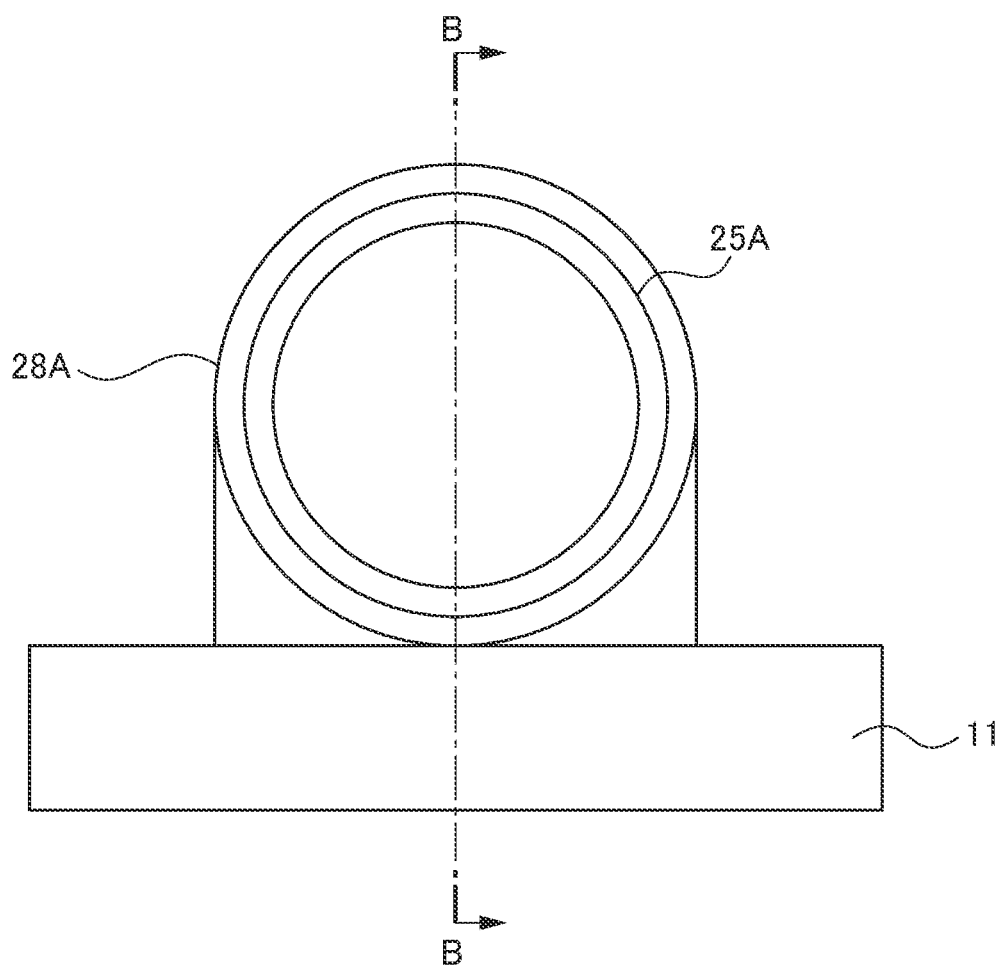
FIG. 5 is a side view of the base part shown in FIG. 4.
Figure 6:
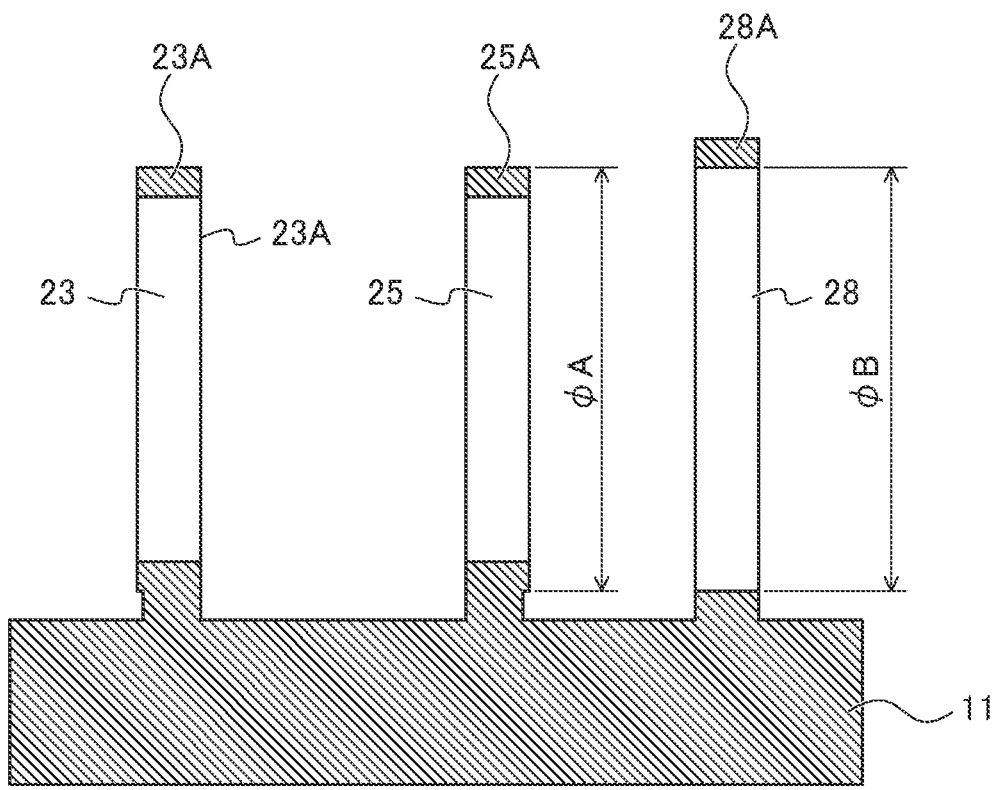
FIG. 6 is a sectional view taken along line B-B in FIG. 5 showing the area around the flanges.

FIG. 5 is a sectional view illustrating the processing of the flanges of the base part 11 of the robot device according to the present embodiment. FIG. 6 is a sectional view taken along line B-B in FIG. 5.

As shown in FIG. 6, in the present embodiment, the base part 11 is processed so that the hollow diameter ϕB (measured from the tip of the protrusion protruding from the base part 11) of the third flange 28 for the second speed reducer 26 is larger than the outer diameter ϕA (measured from the tip of the protrusion protruding from the base part 11) of the second flange 25. As shown in the drawing, the first flange 23, the second flange 25, and the third flange 28 are integrally formed on the base part 11 so that the hollow diameter ϕB>the outer diameter ϕA is satisfied. The outer diameter ϕA in the following description means the outer diameter of the processed surface.

Here, the outermost side of the hollow first flange 23 is a casting surface 23A. Similarly, the outermost side of the hollow second flange 25 is a casting surface 25A. Similarly, the outermost side of the hollow third flange 28 is a casting surface 28A.

Figure 7:
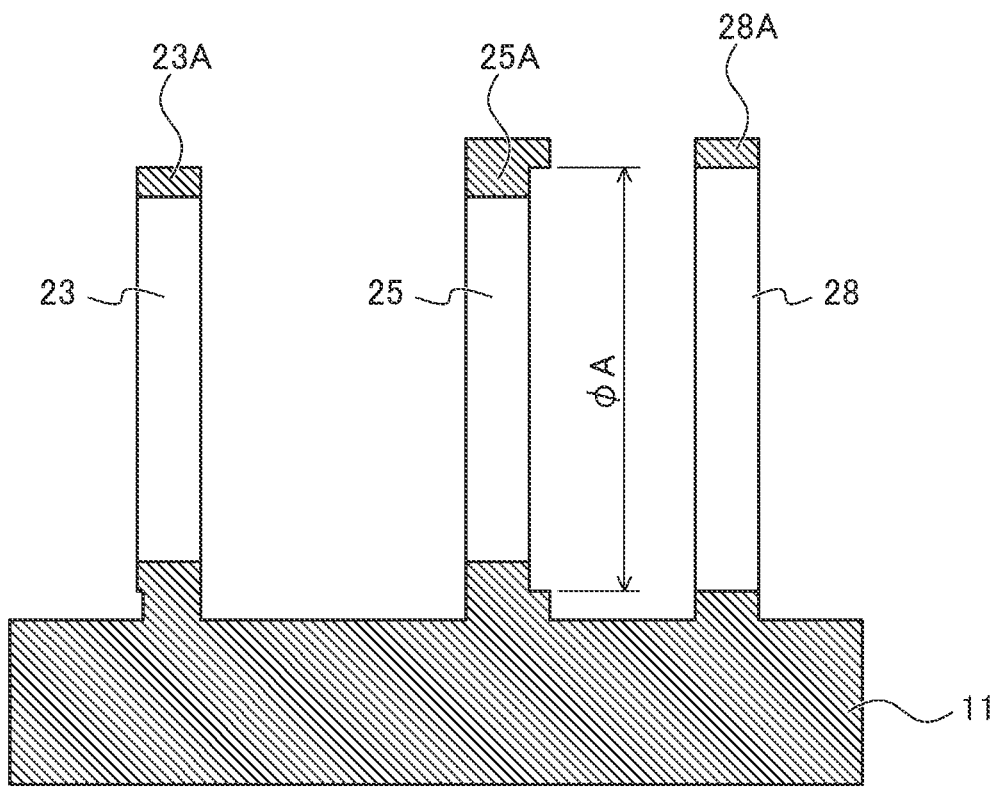
FIG. 7 is a sectional view illustrating the processing of the flanges of the base part of the robot device.

FIG. 7 is a sectional view illustrating the processing of the flanges of the base part 11 of the robot device according to the present embodiment. The section corresponds to a section taken along line B-B in FIG. 5. The same components as those in FIG. 6 are denoted by the same reference numerals, and description thereof is omitted.

In this example, the base part 11 is processed so that the hollow diameter ϕB of the third flange 28 for the second speed reducer 26 is larger than the outer diameter ϕA of the first flange 23 and the second flange 25, and the second flange 25 is subjected to inlay processing.

As described above, the processed surface of the flange includes taps for fixing the adapter component, and pin holes for positioning as necessary. Further, it is desirable that the hollow diameter ϕB of the second flange 25 is approximately equal to the outer diameter ϕA of the processed surface of the first flange 23, but ϕB≥ϕA is not necessarily satisfied as described later. The cylindrical surface of the hollow diameter ϕB of the third flange 28 may be a processed surface or a non-processed surface.

Further, in the present embodiment, since the outer end (the cylindrical surface outside the outer diameter ϕA) as the upper end surface of the second flange 25 is a base casting surface, the outer diameter ϕA includes a deviation of the actual dimensional shape of the casting material and a deviation from the processing standard. However, in the case of the inlay processing shown in FIG. 7, the outer diameter ϕA of the second flange 25 is the actual processing dimension.

Figure 8:
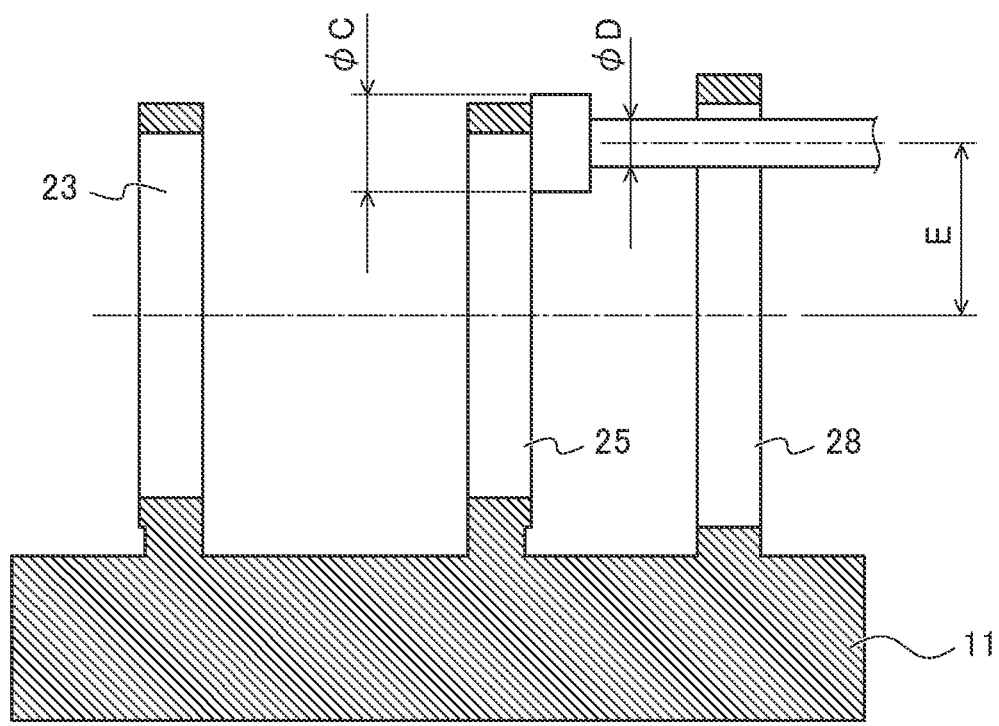
FIG. 8 is a sectional view showing a state of processing the base part of the robot device.

FIG. 8 is a sectional view showing a state of processing the base part of the robot device according to the present embodiment. The section corresponds to a section taken along line B-B in FIG. 5. In FIG. 8, ϕC is the diameter of a processing tool cutter, and ϕD is the diameter (the outermost diameter at the time of rotation) of the extension portion of the processing tool or the holder portion of a processing machine. Although ϕD is uniformly drawn in the drawing, the diameter and shape may change along the length. Although FIG. 8 shows the case of ϕC>ϕD, ϕC≤ϕD may be possible. Here, the diameter ϕD (the outermost diameter) in a range in which the diameter ϕD interferes with the hollow diameter ϕB of the second flange 25 at the time of processing the processed surface of the first flange 23 becomes a problem. At this time, the diameter ϕD portion must be disposed so as not to interfere with the inner wall of the hollow diameter ϕB.

Dimensions A to E must satisfy the relationship shown in the following expression (1). Here, as shown in FIG. 8, the distance E represents the distance between the center axis of the flanges and the center of the processing tool.

$$E+\phi D/2 < \phi B/2, \text{ and } E+\phi C/2 \geq \phi A/2 \tag{1}$$

Thus, the distance E needs to be determined in consideration of a casting deviation as in the case of the base part 11 shown in FIG. 6. On the other hand, as shown in FIG. 7, when the processed surface is recessed, there is an advantage that the distance E can be set without considering a casting deviation. Although the two speed reducers 21 and 22 for the first arm 13 should be of the same type in principle, the speed reducers for the first arm and the speed reducer for the second arm do not need to be of the same type. The same type means that the rated capacity is equivalent, and differences in interface shape and the like shall be allowed.

According to the present embodiment, it is possible to simplify the processing of flanges integrally formed on a base part of a robot device, and to couple a plurality of corresponding speed reducers to the processed flanges with a small number of adapter components.

Second Embodiment

In the above-described embodiment, the robot device in which the two speed reducers for the first arm and the speed reducer for the second arm are arranged in parallel has been described, but the number of the speed reducers for the second arm may be two.

Figure 9:
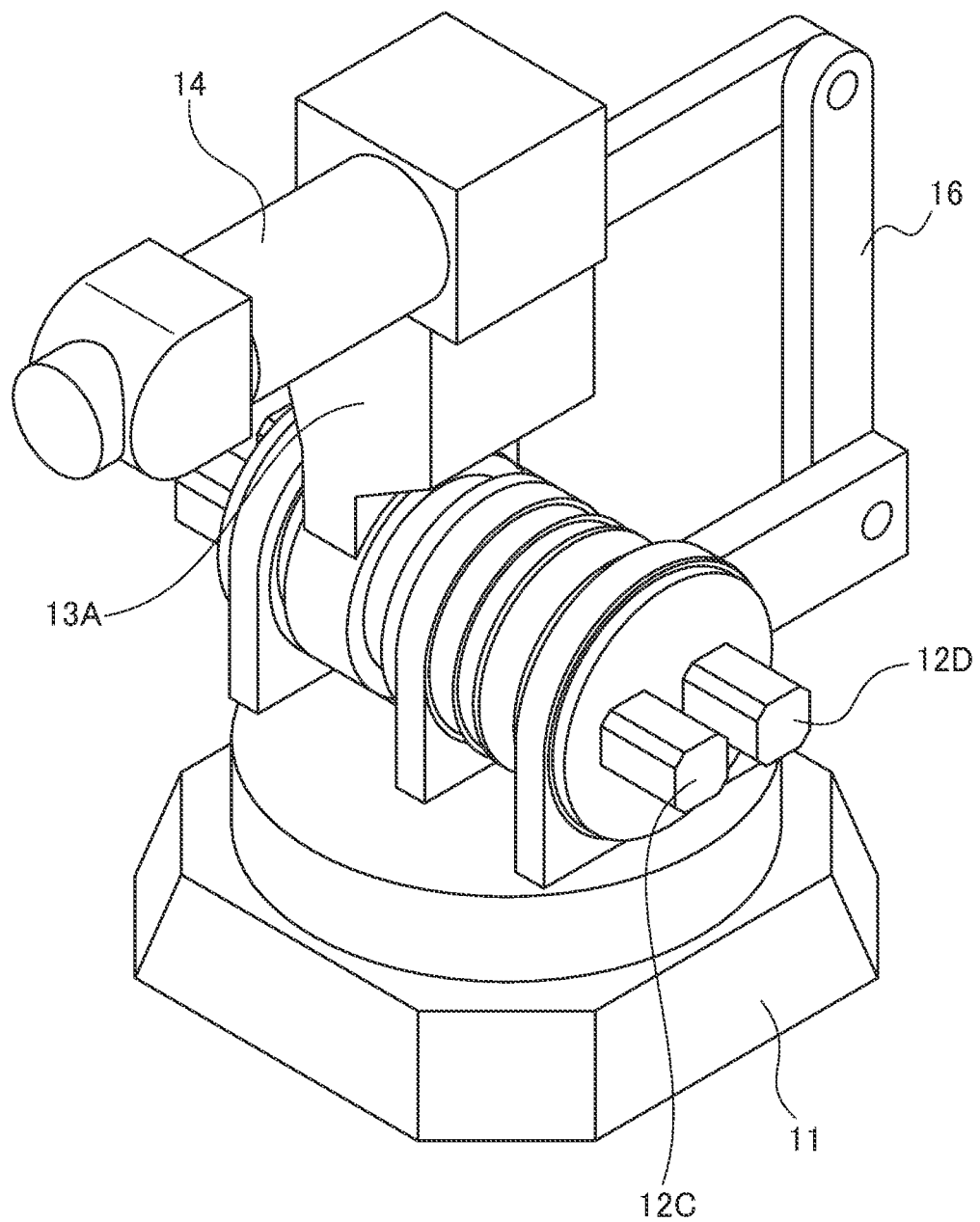
FIG. 9 is a perspective view illustrating the structure of a robot device.
Figure 10:
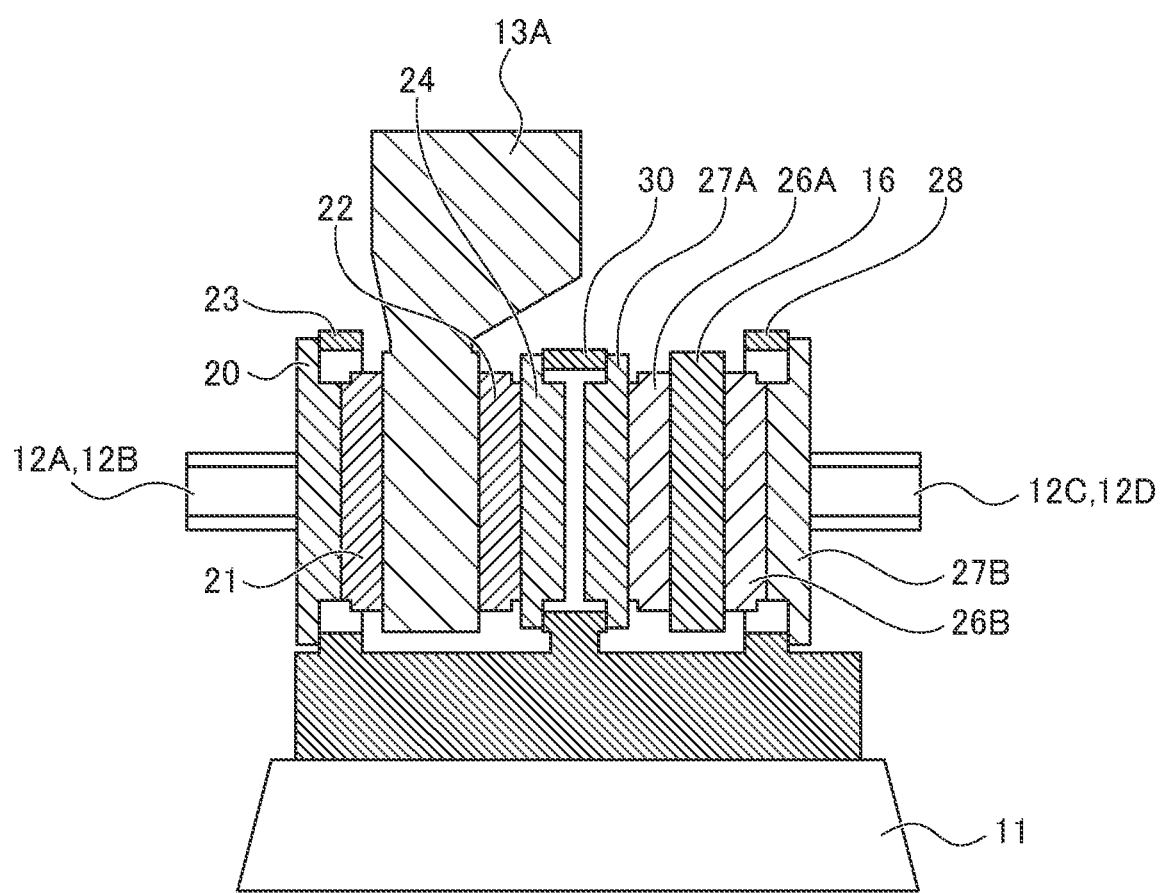
FIG. 10 is a sectional view of the main components shown in FIG. 9.

FIG. 9 is a perspective view illustrating the structure of the robot device according to the present embodiment. FIG. 10 is a sectional view of the main components shown in FIG. 9. This example is characterized in that two speed reducers are arranged so as to sandwich a first arm 13A and two speed reducers are arranged so as to sandwich a second arm 14, along the central axis of the motors, via a central flange 30.

In FIG. 10, the first arm 13A has a shape in which the thickness width of the portion close to a base part 11 is smaller than the thickness width of the portion on the upper side of the speed reducers in order to secure a space for coupling the speed reducers. A first adapter component 24 for a first speed reducer 22 and a third adapter 27A for a second speed reducer 26A are coupled to the base part 11 so as to face each other via the central flange 30.

The second speed reducer 26A is arranged on the left side of a parallel link 16, and the second speed reducer 26A is coupled to the base part 11 using the third adapter 27A. On the other hand, a second speed reducer 26B is arranged on the right side of the parallel link 16, and the second speed reducer 26B is coupled to the base part 11 using a fourth adapter 27B. Thus, even when the number of speed reducers is increased, the speed reducers can be reliably coupled to the base part 11 with a small number of adapter components.

The two speed reducers 21 and 22 for the first arm 13 should be of the same type in principle, and the two speed reducers 26A and 26B for the second arm 14 should be of the same type in principle, but the speed reducers for the first arm and the speed reducers for the second arm do not need to be of the same type. The same type means that the rated capacity is equivalent, and differences in interface shape and the like shall be allowed.

In this example, the central flange 30 has a structure that sandwiches two speed reducers from both sides, but the flanges for fixing the first speed reducer 22 and the second speed reducer 26A may be independently provided. According to the present embodiment, for example, it is possible to realize a small-sized robot device with an ultra-high payload capacity (e.g., 2.5 tons or more).

Third Embodiment

In the above embodiment, the robot device in which the two speed reducers for the first arm and the speed reducer for the second arm are arranged in parallel has been described. In the case of the configuration in which four speed reducers are arranged in parallel, the number of adapter components can be reduced by changing the structure of the base part. An embodiment regarding this will be described with reference to the drawings.

Figure 11:
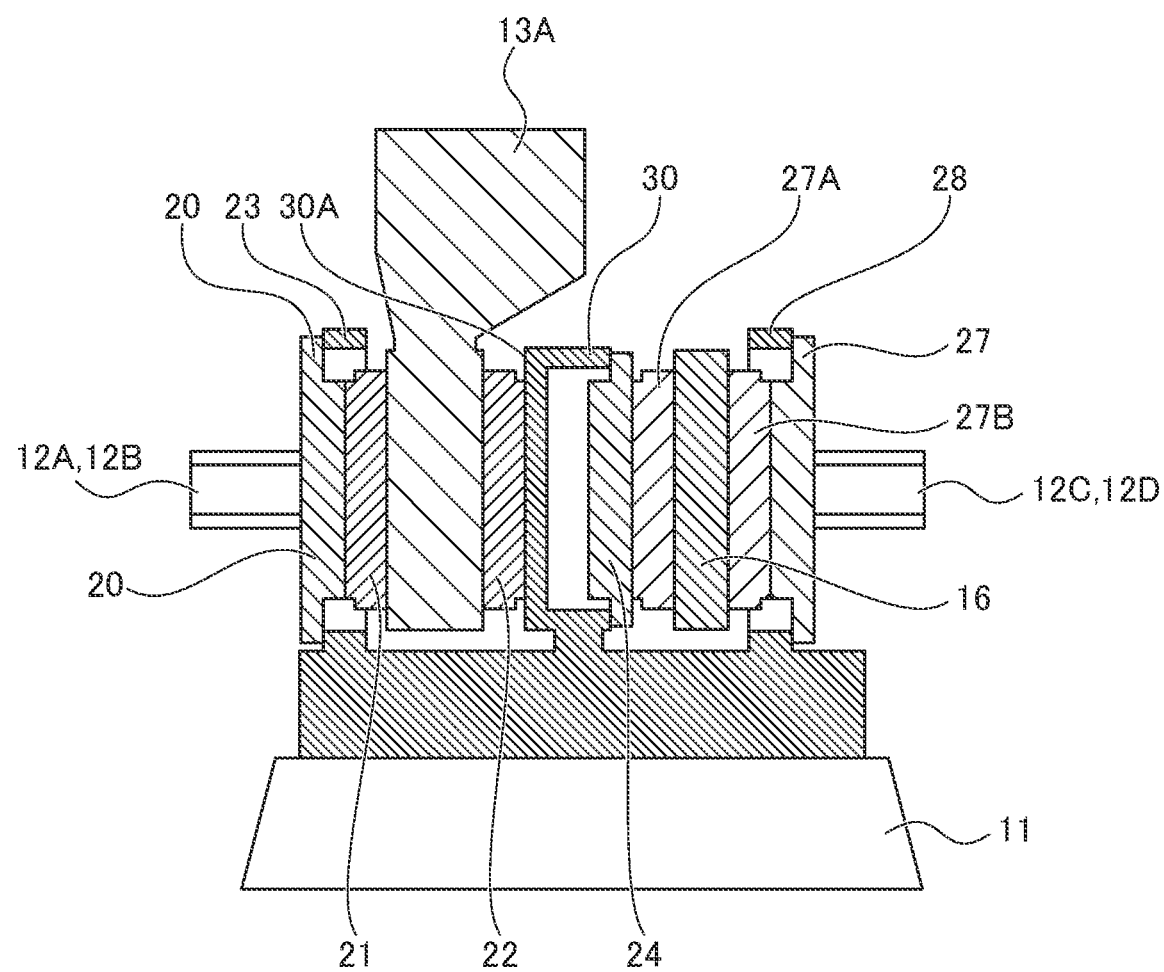
FIG. 11 is a sectional view illustrating the processing of the flanges of the base part of the robot device.

FIG. 11 is a sectional view showing the structure of the base part of the robot device according to the present embodiment. The same components as those in FIG. 10 are denoted by the same reference numerals, and description thereof is omitted. As shown in FIG. 11, a first speed reducer 22 is arranged so as to be sandwiched between a first arm 13A and a processed surface 30A of a central flange 30 and coupled to a base part 11. As a result, even if the number of speed reducers is increased, the number of adapter components for coupling the speed reducers to the base part 11 can be reduced. The present disclosure is not limited to the above-described embodiments, and modifications and improvements are included in the present disclosure to the extent that the objects of the present disclosure can be achieved.

EXPLANATION OF REFERENCE NUMERALS 1 robot device
11 base part
13 first arm
14 second arm
16 parallel link
20 first adapter component
21 first speed reducer
22 first speed reducer
24 first adapter component
26 second speed reducer
27 second adapter component

The invention claimed is:

1. A robot device provided with a base part that houses speed reducers for driving a first arm and a second arm that have a parallel link, the robot device comprising:
    two first speed reducers for driving the first arm and arranged in parallel so as to sandwich the first arm;
    a second speed reducer for driving the second arm and arranged in parallel with the two first speed reducers;
    two first adapter components respectively arranged between the base part and each of the two first speed reducers and respectively coupling the base part to each of the first speed reducers; and
    a second adapter component arranged between the base part and the second speed reducer and coupling the base part to the second speed reducer;
    wherein each of the two first adapter components and the second adapter component are separate from the base part, and is attachable to a respective flange of the base part and one of the first and second speed reducers; and
    wherein the second adapter component has a larger outer diameter than each of the two first adapter components.

2. The robot device according to claim 1, comprising a third speed reducer identical to the second speed reducer, wherein the second speed reducer and the third speed reducer are arranged in parallel so as to sandwich the parallel link for driving the second arm in cooperation with the second and third speed reducers.

3. The robot device according to claim 1, wherein,
    one of the two first adapter components is arranged on an outer side opposite to a second adapter component side with respect to the first arm, and the one of the first adapter components has a larger outer diameter than the other first adapter component, which is arranged on an inner side with respect to the first arm.

\* \* \* \* \*